United States Patent [19]

Michon

[11] 4,129,887

[45] Dec. 12, 1978

[54] SOLID STAGE IMAGING APPARATUS

[75] Inventor: Gerald J. Michon, Waterford, N.Y.

[73] Assignee: General Electric Company, Schenectady, N.Y.

[21] Appl. No.: 847,167

[22] Filed: Oct. 31, 1977

[51] Int. Cl.$^2$ .................. H04N 5/30; H04N 5/33; H04N 3/14

[52] U.S. Cl. .................. 358/213; 250/370; 250/211 R; 358/113

[58] Field of Search .................. 358/113, 212, 213; 250/211 J, 211 R, 578, 370

[56] References Cited

U.S. PATENT DOCUMENTS

| | | | |
|---|---|---|---|
| 3,846,820 | 11/1974 | Lampe et al. .................. | 358/113 X |
| 3,919,468 | 11/1975 | Weimer .................. | 358/213 |

*Primary Examiner*—Robert L. Richardson
*Attorney, Agent, or Firm*—Julius J. Zaskalicky; Joseph T. Cohen; Marvin Snyder

[57] ABSTRACT

Relates to apparatus incorporating a two-dimensional array of image sensing devices arranged in rows and columns onto which a two-dimensional pattern of radiation having rows and columns of elements is scanned in the column direction. For each scan of a row of elements of the pattern of radiation from row to row of the array of image sensing devices a plurality of transformed outputs are obtained, one for each row of the array. Video signals corresponding to the integrated values of the intensities of the elements of the pattern of radiation are obtained by obtaining the inverse transforms of the transformed outputs.

4 Claims, 32 Drawing Figures

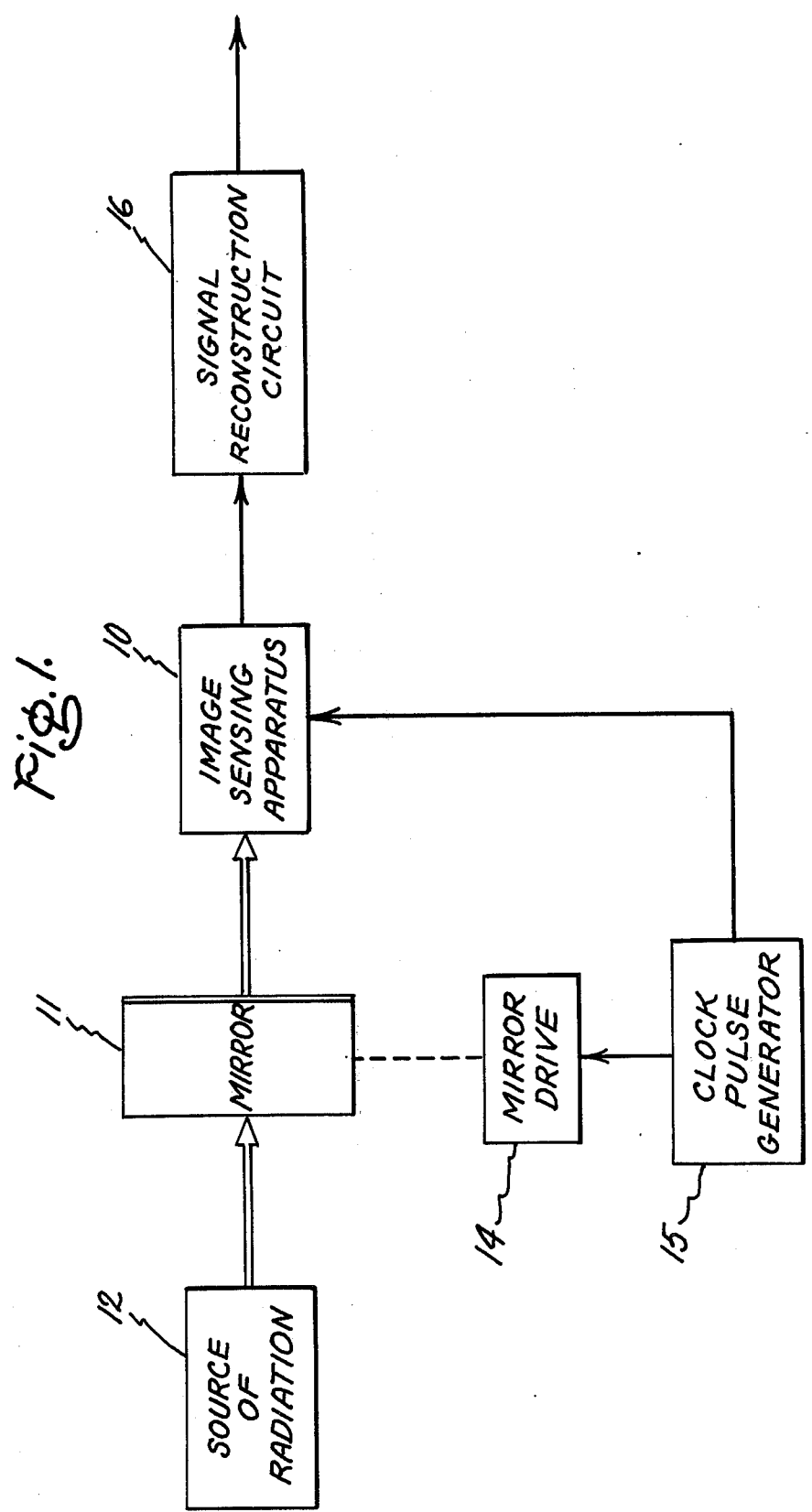

Fig.2A.

|     | $T_1$ | $T_2$ | $T_3$ | $T_4$ |
|-----|-------|-------|-------|-------|
| $T_A$ | + | + | + | + |
| $T_B$ | + | + | − | − |
| $T_C$ | + | − | − | + |
| $T_D$ | + | − | + | − |

| $E_{11}$ | $E_{12}$ | $E_{13}$ | $E_{14}$ |
|----------|----------|----------|----------|
| $E_{21}$ | $E_{22}$ | $E_{23}$ | $E_{24}$ |
| $E_{31}$ | $E_{32}$ | $E_{33}$ | $E_{34}$ |
| $E_{41}$ | $E_{42}$ | $E_{43}$ | $E_{44}$ |
| $E_{51}$ | $E_{52}$ | $E_{53}$ | $E_{54}$ |
| $E_{61}$ | $E_{62}$ | $E_{63}$ | $E_{64}$ |
| $E_{71}$ | $E_{72}$ | $E_{73}$ | $E_{74}$ |
| $E_{81}$ | $E_{82}$ | $E_{83}$ | $E_{84}$ |

Fig.3B.

| $S_{1A}$ | $S_{2B}$ | $S_{3C}$ | $S_{4D}$ | $S_{5A}$ |
|----------|----------|----------|----------|----------|
| $S_{2A}$ | $S_{3B}$ | $S_{4C}$ | $S_{5D}$ | $S_{6A}$ |
| $S_{3A}$ | $S_{4B}$ | $S_{5C}$ | $S_{6D}$ | $S_{7A}$ |
| $S_{4A}$ | $S_{5B}$ | $S_{6C}$ | $S_{7D}$ | $S_{8A}$ |
| $T_A$ | $T_B$ | $T_C$ | $T_D$ | $T_A$ |

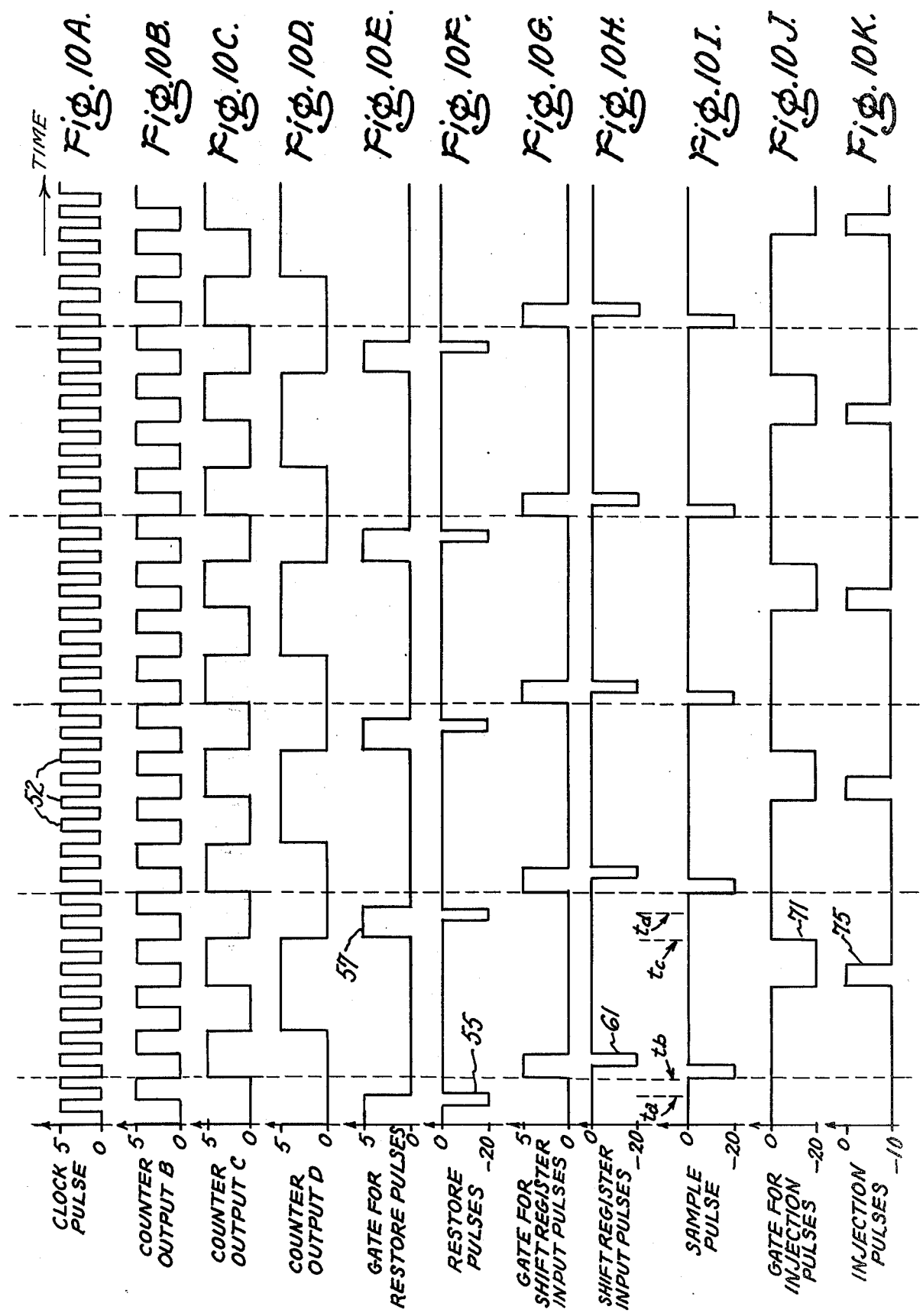

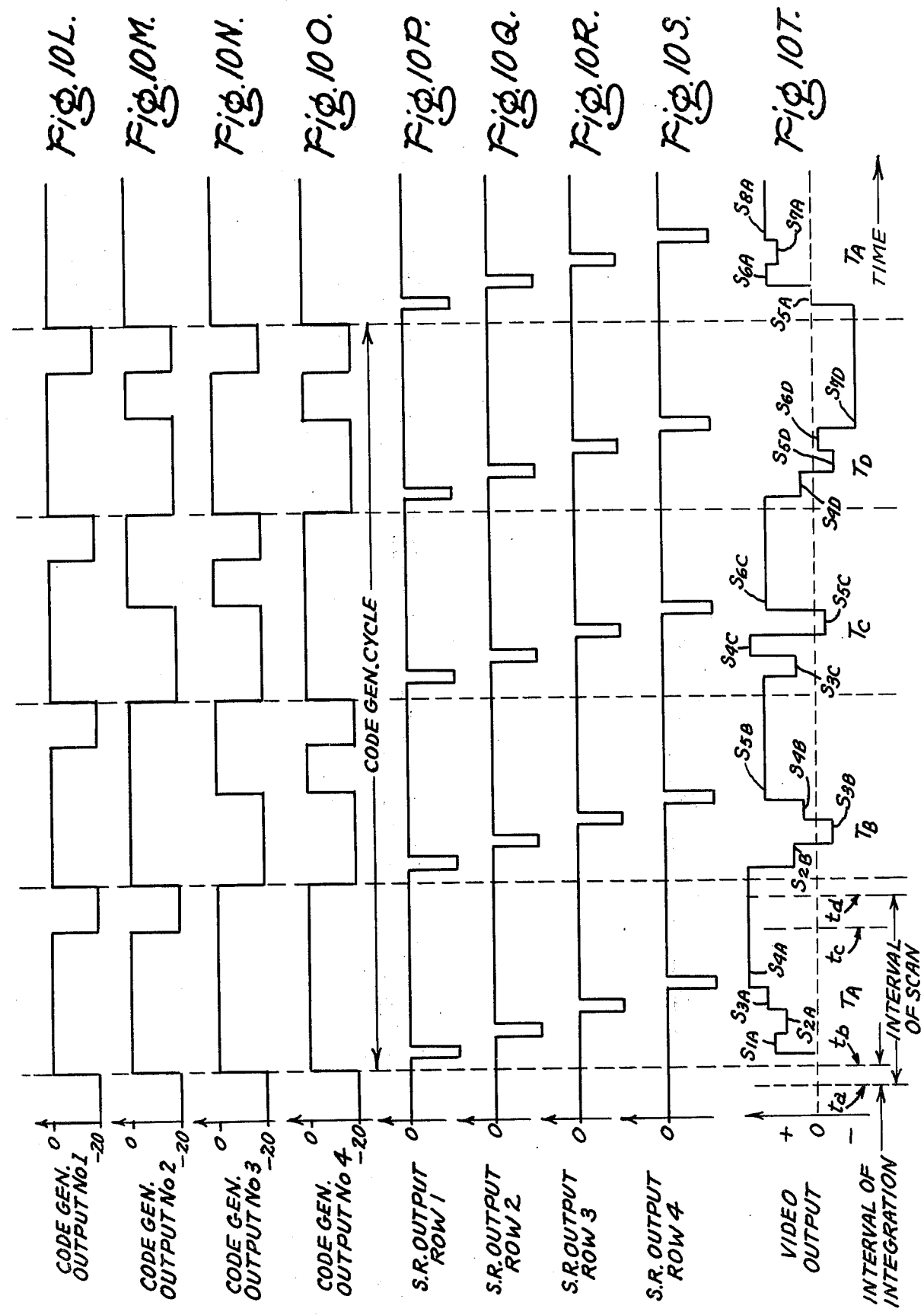

SOLID STAGE IMAGING APPARATUS

The present invention relates in general to solid state imaging apparatus for sensing patterns of radiation imaged thereon, and developing electrical signals in accordance therewith. The present invention relates in particular to apparatus for sensing patterns of infrared radiation.

Sensing of patterns of infrared radiation has been implemented in the past in a parallel scan system using a serial organization of discrete infrared sensitive diodes. In this system, a linear array of discrete photodiodes is mounted in a Dewar for cooling the diodes with each diode capacitively coupled to an amplifier. The image or pattern of radiation from a scene is mechanically scanned with a scanning mirror across the photo-diodes and each amplifier delivers the video signal for one line of display. The gain of each amplifier has to be adjusted to compensate for differences in response between the diodes so that a uniform picture is displayed. The number of diodes used is generally limited by the heat conducted into the Dewar by the diode leads and by the number of individual amplifiers that is practical for implementation.

An improvement on this system was made by the introduction of the time delay and integration technique (TDI) in which the signal from the number of photo-diodes is scanned in a line to improve sensor uniformity, minimize noise, and increase sensitivity. In this system, in place of a single diode for a line of scan, a plurality of diodes are used along with a time delay and integration shift register. The TDI shift register is an analog shift register which is clocked in synchronism with the image mechanical motion so that the signal from each picture element can be summed coherently. The output of the TDI register is displayed as a normal video signal. A major advantage of the TDI system is that the exposure time is increased by a factor proportional to the number of serial diodes utilized without affecting the geometrical resolution. A disadvantage is that the total array must be read during each resolution scan interval with resultant large amplifier band width requirements and hence high noise in the output. A further disadvantage is that additional apparatus is required. For a further description of infrared sensing apparatus and apparatus implementing the time delay and integration technique reference should be made to an article entitled, "Advanced Infrared Focal Array Concepts," by D. F. Barbe, in *Electro Optical System Design* of April, 1977, pg. 50–58.

The present invention is particularly directed to overcoming limitations such as described above in solid state imaging apparatus.

Another object of the present invention is to improve the performance particularly with regard to signal-to-noise ratio and to increase the capability of solid state imaging apparatus.

A further object of the present invention is to provide relatively simple apparatus to implement a time delay and integrate technique of sensing radiation in arrays of solid state devices.

In carrying out the invention in one illustrative embodiment thereof there is provided a substrate of semiconductor material of one conductivity type having a major surface. A first means for forming a first plurality of charge storage sites for opposite type carriers adjacent the major surface of the substrate is provided. A second means for forming a second plurality of charge storage sites for opposite type carriers adjacent the major surface of the substrate, each coupled to a respective charge storage site of the first plurality to form a plurality of coupled pairs of charged storage sites is also provided. The coupled pairs of charged storage sites are arranged in an array of rows and columns. A plurality of row conductor lines are provided, each row line coupled to the storage sites of the first plurality in a respective row of storage sites. A plurality of column conductor lines are provided, each column line coupled to the storage sites of a second plurality is a respective column of storage sites. Means are provided for scanning a two-dimensional pattern of radiation having elements located in a matrix of columns and rows across the substrate in the column direction thereof at a substantially constant rate to produce a pattern of opposite type carriers of variable quantity in the plurality of storage sites. The pattern of radiation has the same number of elements in a row thereof as the number of storage sites in a row of storage sites and has a number of elements in a column exceeding the number of storage sites in a column of storage sites.

The column to column spacing of the elements of the pattern of radiation is equal to the column to column spacing of the storage sites. The row to row to spacing of the elements of the pattern of radiation is equal to the row to row spacing of the storage sites. A row of elements of the pattern of radiation scans from a row of storage sites to an adjacent row of storage sites in a predetermined interval of time. Means are provided for algebraically summing at the end of a predetermined interval of scan the quantities of opposite type carriers stored in each of the rows of storage sites with an algebraic summation code to derive a respective summation signal and thereafter injecting the quantities of opposite type carriers into the substrate. The quantity of opposite type carriers in each storage site is proportional to a respective element of the pattern of radiation. The algebraic summation at the end of each successive interval of scan is effected in accordance with a respective successive algebraic summation code. The successive algebraic summation codes constitute a repeating one-dimensional transform.

The novel features which are believed to be characteristic of the present invention are set forth with particularity in the appended claims. The invention itself, both as to its organization and method of operation, together with further objects and advantages thereof may best be understood by reference to the following description taken in connection with the accompanying drawings wherein:

FIG. 1 shows a block diagram of imaging apparatus in accordance with the present invention.

FIGS. 2A, 2B, and 2C show three diagrams useful in explaining the operation of the present invention. FIG. 2A shows a Hadamard matrix of the fourth order. FIG. 2B shows four equations, each including the same independent variables which are algebraically summed according to the code represented by a respective row of the matrix of FIG. 2A. Each of the variables represents a signal corresponding to the charge stored in a respective storage device of a row of storage devices of the apparatus of FIG. 9. FIG. 2C shows four equations in which the independent variables are the four sums of FIG. 2B. The independent variables are summed in accordance with the summation codes represented by the columns of the Hadamard matrix of FIG. 2A to obtain the inverse transforms of the independent variables and hence to obtain four sums each proportional to a respective one of the independent variables of FIG. 2B.

FIGS. 3A and 3B show two additional diagrams useful in explaining the operation of the present invention. FIG. 3A shows an image sensing array (shown in heavy outline) having four rows and four columns of charge storage devices. Superimposed on the array is a two-dimensional pattern of radiation (shown in dotted outline) having the same number of columns of elements as there are columns in the array and having a greater number of rows of elements than the rows of charge storage sites in the array. FIG. 3B shows a matrix of sums arranged in columns and rows. The four sums in a column represent algebraic summations of the charges stored in corresponding rows of the array with the algebraic summations being performed with the same code. With the scanning of the two-dimensional pattern of radiation across the array in the column direction successive sets of four algebraic summations are performed, each set of four summations being in accordance with a respective successive algebraic summation code. A set of successive algebraic summation codes are designated at the bottom of the columns and constitute a complete repeating one-dimensional transform.

FIGS. 10A–10T are diagrams of amplitude versus time of voltage waveforms occurring at various points in the system of FIG. 9. The point of occurrence of a waveform of FIGS. 10A–10T in the block diagram of FIG. 9 is identified in FIG. 9 by a literal designation corresponding to the literal designation of the FIGS. 10A–10T.

Figure 4:
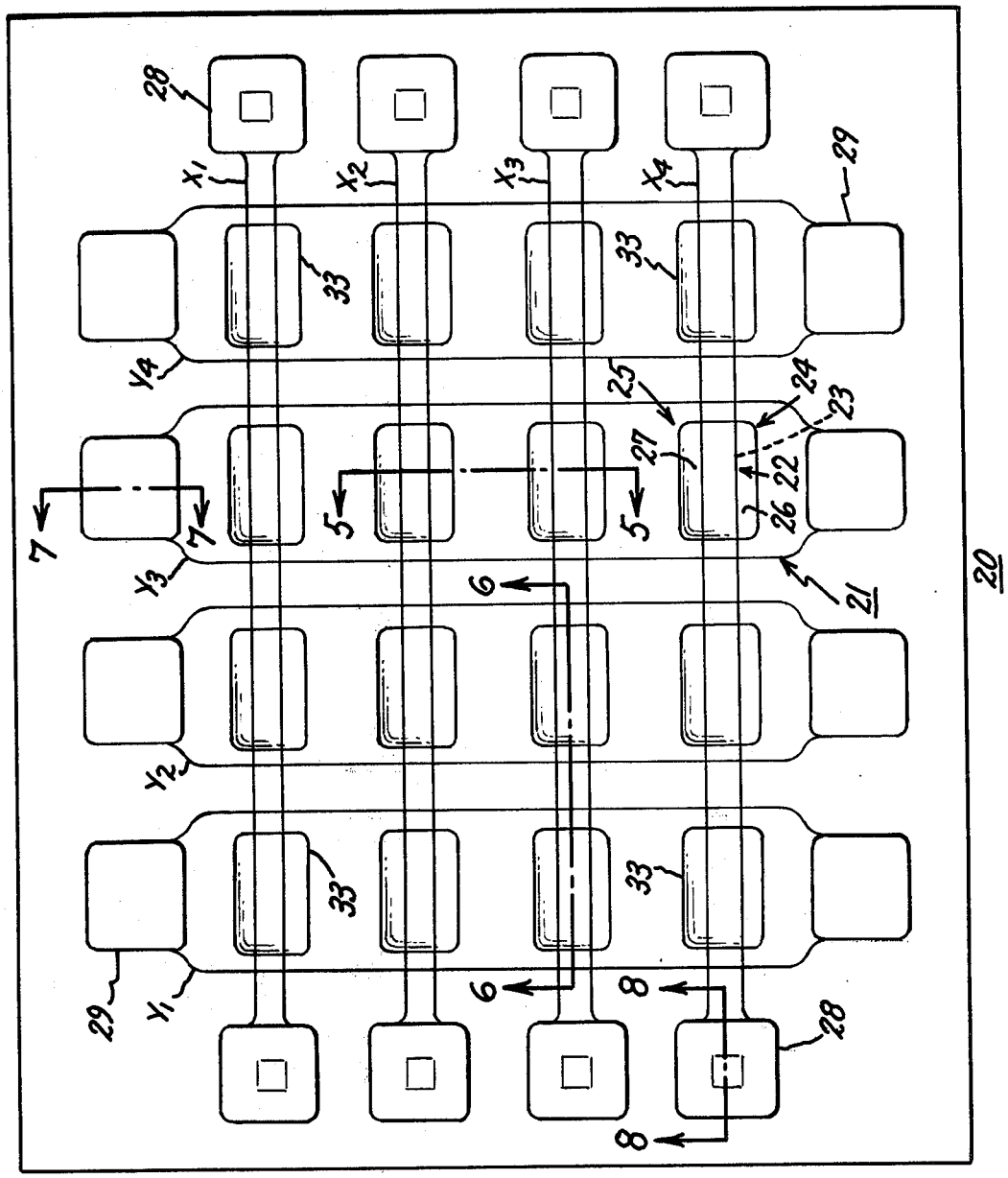
FIG. 4 is a plan view of an array or an assembly of a plurality of radiation responsive devices formed on a common semi-conductor substrate and incorporated in the apparatus of the present invention shown in FIG. 9.
Figure 5:
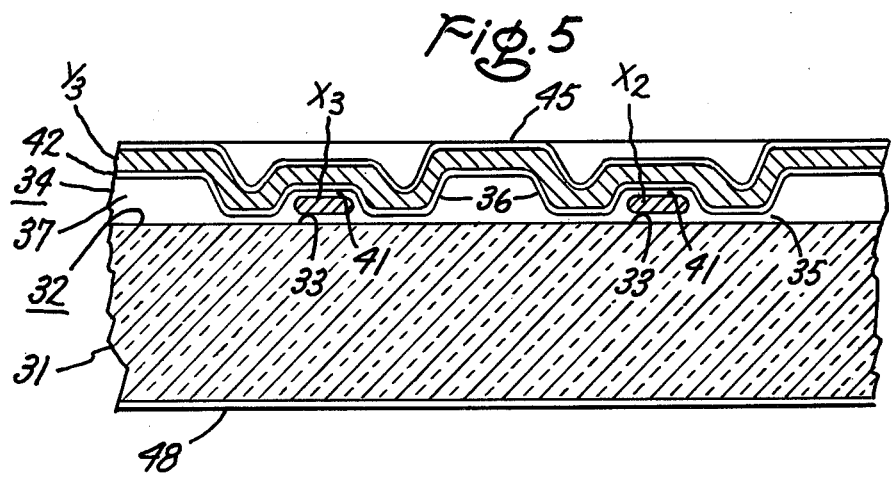
FIG. 5 is a sectional view of the assembly of FIG. 4 taken along section lines 5—5 of FIG. 4.
Figure 6:
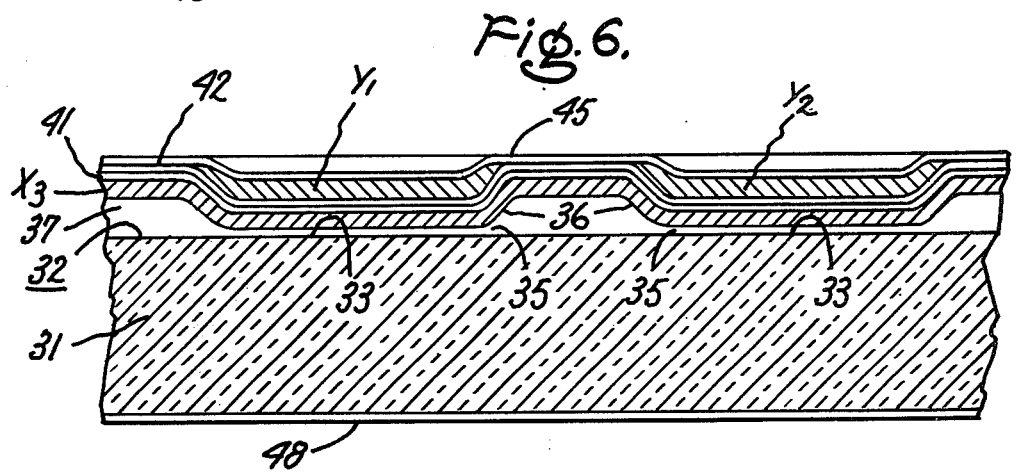
FIG. 6 is a sectional view of the assembly of FIG. 4 taken along section lines 6—6 of FIG. 4.
Figure 7:
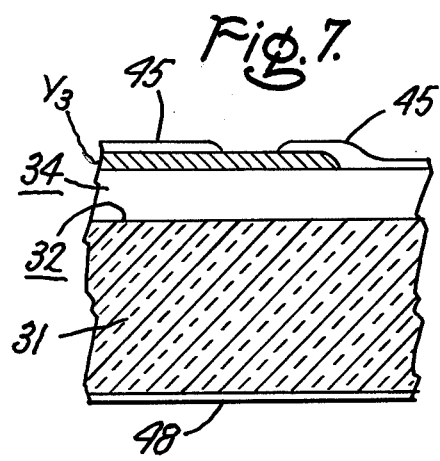
FIG. 7 is a sectional view of the assembly of FIG. 4 taken along section lines 7—7 of FIG. 4.
Figure 8:
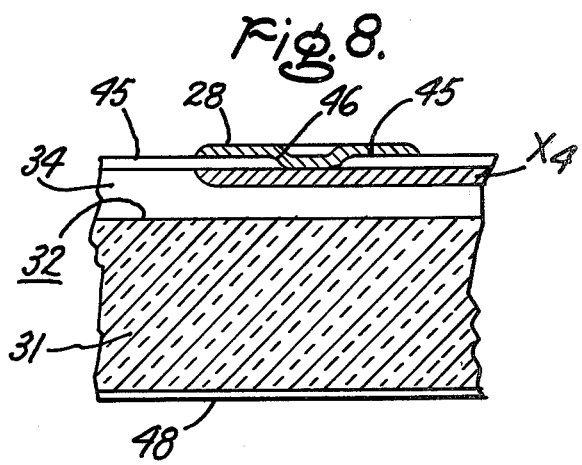
FIG. 8 is a sectional view of the assembly of FIG. 4 taken along section lines 8—8 of FIG. 4.
Figure 9:
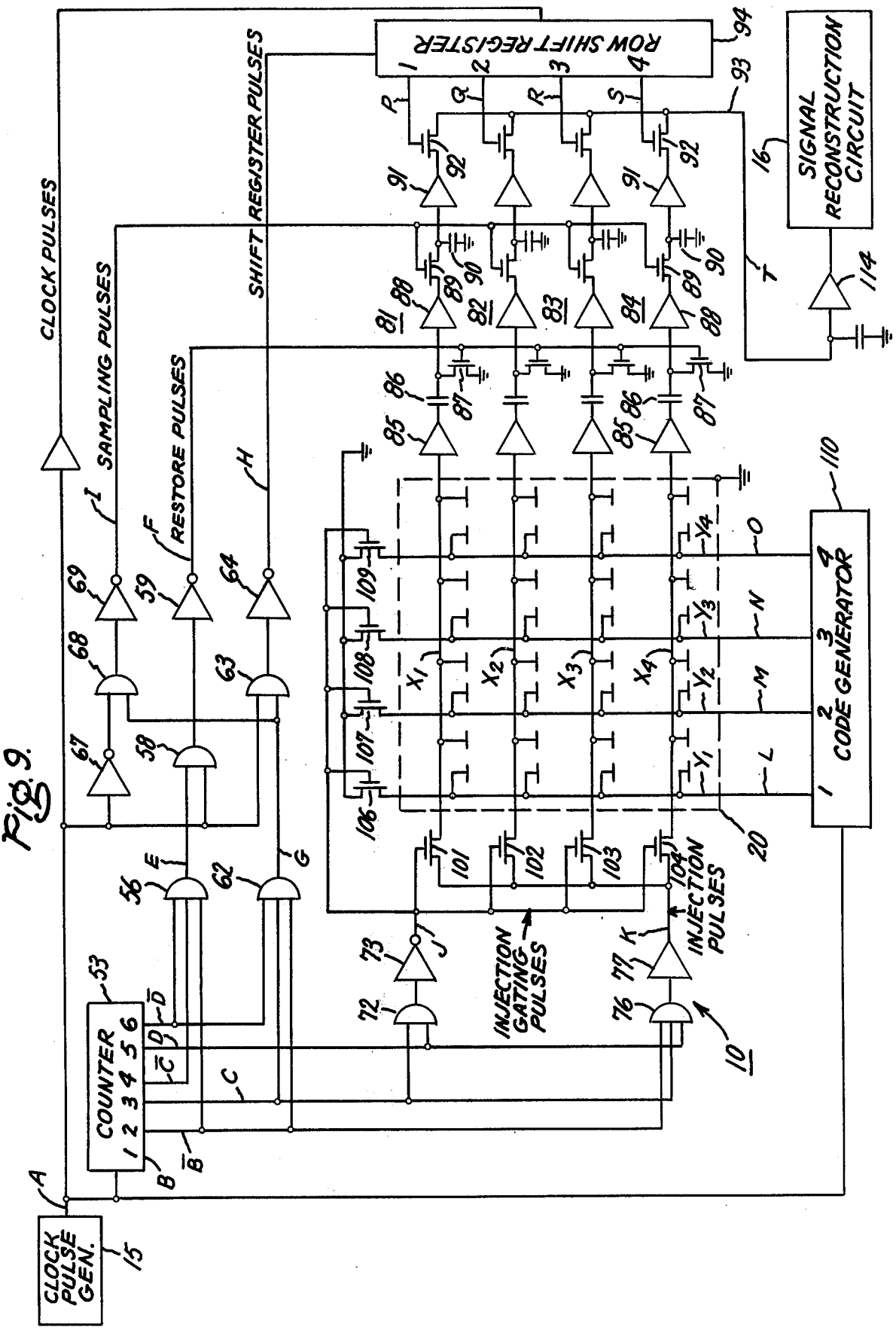
FIG. 9 is a block diagram of an image sensing apparatus in accordance with the present invention.

Reference is now made to FIG. 1 which shows a block diagram of image sensing apparatus 10, such as shown in FIG. 9, including a two-dimensional array of radiation sensing devices, such as shown in FIG. 4, and also includes a mirror 11 which images a two-dimensional pattern of radiation from a source 12 of radiation onto the two-dimensional array of radiation sensing devices. The mirror 11 is rotated by a suitable mirror driver 14 to cause a two-dimensional pattern of radiation to move across the array in one direction, for example, along the column direction of the array. The rate of movement of the two-dimensional pattern of radiation across the array and the processing of the signals produced in the array are synchronized by a clock pulse generator 15 to provide a transformed video output from each of the rows of the array, as will be described in detail in connection with FIGS. 2A, 2B, 2C, 3A and 3B, and FIG. 9, and 10A–10T. The transformed output is applied to a signal reconstruction circuit which converts the signals applied thereto into video signals corresponding to the integrated values of the point intensities of the pattern of radiation.

Reference is now made to FIGS. 2A, 2B, 2C, 3A and 3B for a description of the principles used in carrying out the invention. FIG. 2A shows a Hadamard matrix of the fourth order having four rows and four columns. The summation codes of the four rows are designated $T_A$, $T_B$, $T_C$, and $T_D$, respectively and the summation codes of the four columns are designated, $T_1$, $T_2$, $T_3$, and $T_4$, respectively. FIG. 3A shows the image sensing array of FIG. 4 (in heavy outline) having four rows and four columns of radiation sensing and charge storage devices. Superimposed on the array of radiation sensing and charge storage devices is a two-dimensional pattern of radiation (in dotted outline) having the same number of columns of elements as there are columns in the array and having a greater number of rows of elements than there are rows of devices in the array. The time integrated value of radiation received from an element of the pattern of radiation as measured by charge accumulated in a device in the array is designated by the symbol E. The first subscript of the symbol E represents the row location of the element and the second symbol represents the column location of the element. For example, the symbols $E_{41}$, $E_{42}$, $E_{43}$, and $E_{44}$, represent successive elements of the fourth row of the radiation pattern. The pattern of radiation is shown as having the same number of elements in a row as the number of devices in a row of the array. The pattern of radiation is shown as having a number of elements in a column exceeding the number of devices in a column of the array. The column to column spacing of the elements of the radiation pattern is equal to the column to column spacing of the devices of the array. The row to row spacing of the elements of the radiation pattern are equal to the row to row spacing of the devices of the array. In the operation of the apparatus shown in block form in FIG. 1 rotation of the mirror 11 causes the pattern of radiation to move across the array of radiation sensing devices in the column direction at a substantially constant rate. The interval of time elapsed from the movement of a row of elements of the pattern of radiation from registry with a row of devices to registry with an adjacent row of devices is referred to as the interval of scan. In FIG. 3A, the first four rows of elements of the radiation pattern are shown in registry with the four rows of devices. Assume that the pattern of radiation has caused charge to accumulate in each of the devices of the array representing the time integrated value of the radiation intensity. At this time, i.e. at the end of an interval of scan, an algebraic summation is made of the charge stored in the devices of each of the rows in accordance with a predetermined summation code $T_A$. The sums for each of the four rows are designated respectively $S_{1A}$, $S_{2A}$, $S_{3A}$, and $S_{4A}$, and are shown in the first column of the matrix of FIG. 3B below which is shown the particular code utilized, code $T_A$. After the summation is performed the charges stored in the storage regions of the array are removed or injected into the substrate and a new accumulation of the charges in the device takes place over a second scan interval during which each of the rows of elements of the radiation pattern moves to a respective adjacent row. For example, the fourth row of elements of the radiation pattern moved from the fourth row of the array to the third row of the array. During this movement charge accumulates in the devices of the array. At the end of the second interval of scan a second algebraic summation is taken of the charges stored in the devices in each of the rows of the array. The summation is shown in the second column of the matrix of FIG. 3B. During the second interval of scan, the elements in the first row of the radiation pattern have moved off the array and the elements of the second row of the radiation pattern now are in registry with the devices of the first row of the array. Thus, the sum of the second row of elements of the pattern of radiation designated $S_{2B}$ appears first in the second column of the matrix of FIG. 3B, the subscript 2 indicating that the sum is taken of the second row of elements of the radiation pattern and the subscript B indicating that the summation was performed in accordance with a second summation code designated $T_B$, and shown as the second row of the matrix of FIG. 2A. Similarly, the third row of elements of the radiation pattern has moved to registry with the second row of devices and accordingly the sum of the charges stored are represented by the symbol $S_{3B}$. Similarly, the sum taken in the third row of devices is designated $S_{4B}$ and the sum taken in the fourth row of devices is designated $S_{5B}$. At the end of the algebraic summations the charges stored in the devices of the array are again removed from the storage devices and a third interval of scan is initiated. At the end of the third interval of scan a third summation is performed in accordance with a summation code $T_C$, shown as the third row of the matrix of FIG. 2A. The resultant sums are shown in the third column of the matrix of FIG. 3B. In similar fashion at the end of a fourth interval of scan a fourth summation in accordance with the summation code $T_D$ shown as the fourth row of the matrix of FIG. 2A is performed to obtain the sums shown in the fourth column of the matrix of FIG. 3B. During each of the next set of four successive intervals of scan, a respective set of four summations are performed in accordance with respective codes $T_A$, $T_B$, $T_C$, and $T_D$. In FIG. 3B the summation code utilized at the end of the first interval of the second set of four intervals of scan is shown as $T_A$. The set of four summation codes $T_A$, $T_B$, $T_C$, and $T_D$ represent a complete one-dimensional Hadamard transform. The matrix shown in FIG. 2A is referred to as a fourth order Hadamard matrix. In the matrix of FIG. 3B the sums $S_{4A}$, $S_{4B}$, $S_{4C}$, and $S_{4D}$ are blocked in and represent the complete one-dimensional Hadamard transform of the charges generated in the devices of the array by the same rows of elements of the radiation pattern. The sum $S_{4A}$ represents the sum of the charges in the fourth row of devices produced by the fourth row of elements of the pattern of radiation and summed in accordance with the summation code $T_A$. The sum $S_{4B}$ represents the sum of charges in the third row of devices produced by the fourth row of elements of the pattern of radiation and summed in accordance with the summation code $T_B$. The sum $S_{4C}$ represents the sum of the charges produced by the fourth row of elements of the pattern of radiation and summed in accordance with the summation code $T_C$. Finally, the sum $S_{4D}$ represents the sum of the charges in the first row of devices produced by the fourth row of elements of the pattern of radiation and summed in accordance with the summation code $T_D$. The sums $S_{4A}$, $S_{4B}$, $S_{4C}$, and $S_{4D}$, are set forth in the four equations of FIG. 3B. These equations represent a complete set of one-dimensional Hadamard transforms of the radiation pattern elements $E_{41}$, $E_{42}$, $E_{43}$, and $E_{44}$. Thus, the sums $S_{4A}$, $S_{4B}$, and $S_{4C}$, and $S_{4D}$ represent, respectively, algebraic sums of the elements $E_{41}$, $E_{42}$, $E_{43}$, and $E_{44}$, in accordance with the signs set forth in respective rows A through D of the Hadamard matrix of FIG. 2A. The manner in which the summation signals $S_{4A}$, $S_{4B}$, $S_{4C}$, and $S_{4D}$, are obtained in the apparatus of FIG. 9 will be explained in connection with the description of the organization and operation thereof.

As the sums shown in the matrix of FIG. 3B are derived they are stored in suitable apparatus, such as a random access memory array, and after the elapse of the fourth interval of scan at which time the sums $S_{4A}$, $S_{4B}$, $S_{4C}$, and $S_{4D}$ would be available, they would be retrieved and the independent variables $E_{41}$, $E_{42}$, $E_{43}$, and $E_{44}$, derived by taking the inverse transform of the sums $S_{4A}$, $S_{4B}$, $S_{4C}$, and $S_{4D}$, as set forth in the four equations of FIG. 2C. The four equations of FIG. 2C are derived by applying the summation codes $T_1$ through $T_4$, respectively, shown in FIG. 2A, to the sequence of sums $S_{4A}$, $S_{4B}$, $S_{4C}$, and $S_{4D}$. Thus, the values $E_{41}$, $E_{42}$, $E_{43}$, and $E_{44}$, representing the values of radiation received from the fourth row of elements of the radiation pattern are recovered. In FIG. 2C, each of the sums is equal to a respective one of signals $E_{41}$, $E_{42}$, $E_{43}$, and $E_{44}$, multiplied by a factor of four. Thus, the signal would be increased by a factor of 4 and any random noise associated with the signal generation and readout would sum vectorally. Consequently, the signal-to-noise ratio would improve by the square root of the number or readouts summed, namely 2 in this example. Also, as the sums $S_{4A}$, $S_{4B}$, $S_{4C}$, and $S_{4D}$ each were summed in different rows of devices, both the sensitivity variations and the pattern noise variations in the rows of devices are averaged. A further advantage in the apparatus is that the bandwidth requirements of the devices utilized in recovering the signal from the array are only one-fourth as great as the bandwidth required were each of the devices of the array sensed individually.

It will be understood that, while a four by four array of radiation sensing devices was utilized, higher order arrays may be used as desired, and of course where patterns of radiation have columns of elements exceeding the number of columns of the devices utilized, additional arrays coulld be utilized to provide the columns of devices for sensing the desired number of columns of elements of the pattern of radiation.

Before proceeding to describe the apparatus 10 of FIG. 9 embodying the present invention, the array of radiation sensing and charge storage devices used in the apparatus will be described. While a specific form of the array is shown and described, it will be understood that other arrays may be utilized.

Reference is now made to FIGS. 4–8 which shows an image sensing array 20 of radiation sensing devices 21. Each device 21 of the array includes a first or row CIS (conductor-insulator-semi-conductor) charge storage capacitor 22 of generally rectangular outline in which the plate or conductor 23 thereof is connected to and is integral with the row conductor line of the row in which the device is located and a pair of column CIS charge storage capacitors 24 and 25, collectively designated as a second charge storage capacitor, and also of generally rectangular outline, each adjacent a respective side of the row CIS charge storage capacitor 22 in which the plates or conductors 26 and 27 thereof are connected to and are integral with the column conductor line or stripe of the column in which the device is located. The radiation sensing devices 21 are arranged in four rows and columns. The array includes four row conductor lines, each connecting the row plates of a respective row of devices and are designated from the top to the bottom $X_1$, $X_2$, $X_3$, and $X_4$. The array also includes four column conductor lines or stripes orthogonally oriented with respect to the row conductor lines, each connecting the column plates of a respective column of devices and are designated from left to right $Y_1$, $Y_2$, $Y_3$, and $Y_4$. The row lines are constituted of a light transmissive material such as doped polycyrstalline silicon and the column lines are constituted of another light transmissive conductive material, such as indium oxide doped with tin oxide, referred to as indium tin oxide. Conductive connections are made to the row lines $X_1$-$X_4$ through conductive landings or contact tabs 28 provided at both ends of each of the row lines. Conductive connections are made to the column lines $Y_1$-$Y_4$ through conductive landings or contact tabs 29 provided at both ends of each of the column lines.

The array includes a substrate or wafer 31 of semiconductor material having a major face 32 in which are provided a plurality of surface regions 33. The surface regions 33 are arranged into a plurality of rows and columns. The surface regions 33 are of substantially identical area and outline. As shown, the surface regions 33 are of generally rectangular outline with the long sides parallel to the row direction and the short sides parallel to the column direction of the array. A thick layer 34 of light transmission insulating material overlies the major surface and has a plurality of thin portions 35, each in registry with a respective one of the surface regions 33. The thin portions are provided by forming deep recesses 36 in a thick insulating layer. Thus, the insulating layer 34 includes thick portions 37 surrounding a plurality of thin portions 35 in the bottoms of the recesses 36 in a thick insulating layer. A plurality of row conductor lines $X_1$-$X_4$ each of the same and uniform width are provided overlying the layer of insulation. Each row conductor line is in transversing relationship to the surface regions 33 of a respective row of surface regions and overlies fixed first portions of the surface region of the respective row. The portions of the row conductor lines overlying the surface regions 33 constitute the conductors of a plurality of first conductor-insulation-semiconductor capacitors formed with the insulating layer 35 and the substrate 31. A plurality of column conductor lines $Y_1$-$Y_4$ each of the same and uniform width are provided insulatingly overlying the row conductor lines. Each column conductor line being in traversing relationship to the surface regions 33 of a respective column of surface regions and overlying entirely the surface regions of the respective column. Portions of the column conductor lines overlying the surface regions not shielded or masked by the row conductor lines constituting the split conductors 26 and 27 of a plurality of second conductor-insulator-semiconductor capacitors formed with the thin portions 35 of the insulating layer and the substrate. Each second conductor-insulator-semiconductor capacitor includes a pair of capacitors 24 and 25 both of which are coupled to a respective first conductor-insulator-semiconductor capacitor 22.

The array 20 and the devices 21 of which they are comprised may be fabricated using a variety of materials and in a variety of sizes in accordance with established techniques for fabricating integrated circuits. Further information on the fabrication and construction of the array is included in U.S. Pat. No. 3,988,613 assigned to the assignee of the present invention and which is incorporated herein by reference thereto.

Referring now to FIG. 9 there is shown a block diagram of apparatus utilizing the radiation sensing and charge storage array of FIG. 4 and which provides transformed output signals of the pattern of radiation imaged on the array by an optical system such as shown in the block diagram of FIG. 1. The transformed outputs may be processed in various ways to convert the transformed output into video signals corresponding to the integrated values of point intensities of the pattern of the elements of the pattern of radiation as sensed by the individual devices of the array.

The system will be described in connection with FIGS. 10A-10T which show diagrams of amplitude versus time of waveforms occurring at various points in the system of FIG. 9. The point of occurrence of a waveform of FIGS. 10A-10T is referenced in FIG. 9 by a literal designation corresponding to the literal designation of the figure reference.

The system includes a clock pulse generator 15 which develops a series of regularly occurring clock pulses 52 of short duration shown in FIG. 10A. The output of the clock pulse generator 15 is applied to a counter 53 which has six output terminals 1 through 6. The output at terminal 1 is the clock pulse input divided by 2 and is shown in the diagram of FIG. 10B. The output of terminal 2 is the inverse of the output of terminal 1, i.e. the output of terminal 1 with polarity inverted. The output of terminal 3 is the clock pulse input divided by 4 and is shown in FIG. 10C. The output of terminal 4 is the inverse of the output of terminal 3. The output of terminal 5 is the clock pulse input divided by 8 and is shown in FIG. 10D. The output of terminal 6 is inverse of the output of terminal 5.

To provide the restore pulses 55 shown in FIG. 10F for apparatus, the outputs of terminals, 2, 4, and 6 of counter 53 are added in AND gate 56 to obtain gating pulses 57 as shown in FIG. 10E. The pulses 57 are then anded with the clock pulses 52 from the output of the clock pulse generator 15 to obtain an output which when inverted and translated in level by the inverting driver 59 are restore pulses 55.

The row shift register pulses 61 of FIG. 10H are also derived from the outputs of the counter 53 and the clock pulse generator 51 by means of the AND gates 62 and 63 and the inverting driver 64. The outputs at terminals 2, 3, and 6 of counter 53 are applied to the inputs of the AND gate 62. The output of the AND gate 62 is anded with the output of the clock pulse generator 51 in the AND gate 63. The output of AND gate 63 is applied to the input of the inverting driver 64 to obtain the shift register input pulses 61 of FIG. 10H.

The sampling pulses 65 of FIG. 10I are derived from the outputs of the counter 53 and the clock pulse generator 51 utilizing an inverter 67, an AND gate 62, an AND gate 68, and an inverting driver 69. The output of the AND gate 62 is anded in the AND gate 68 with the clock pulses inverted by inverter 67 to provide an output which is translated in level and inverted by the inverting driver 69 to provide the waveform shown in FIG. 10I.

The gating for injection pulses is provided by pulses 71 of the waveform of FIG. 10J. The waveform of FIG. 10J is derived from the counter 53 utilizing the AND gate 72 and the inverting driver 73. The outputs of terminals 3 and 5 of counter 53 are added by the AND gate 72, the output of which is translated in level and inverted by the inverting driver 73 to provide the waveform of FIG. 10J.

The injection pulses 75 of FIG. 10K are derived from the counter 53 utilizing AND gate 76 and driver 77. The output at terminals 2, 3, and 5 of counter 53 is anded by the AND gate 76, the output of which is translated in level by the driver 77 to provide the waveform of FIG. 10K.

The sensing array 20 which is identical to the sensing array of FIG. 4 and is identically designated, includes row conductor lines $X_1$-$X_4$ and column conductor lines $Y_1$-$Y_4$. The drive and timing circuits described above and the drive and readout circuits to be described below for the row conductor lines $X_1$-$X_4$ and for the column conductor lines $Y_1$-$Y_4$ of array 20 may be included on the same substrate as the array to minimize the number of external connections which are required to be made for connection of the array 20 into the system.

To enable simultaneous readout of the charges stored in the storage regions of each of the rows of charge storage devices, a plurality of readout channels 81 through 84 are provided, each for respective rows 1 through 4. Each of the readout channels 81 through 84 includes a pre-amplifier stage, a sample and hold stage, and a multiplex stage. The pre-amplifier stage includes a pre-amplifier 85 a restorer capacitor 86 and a restorer switch 87 in the form of a MOSFET transistor. The sample and hold stage includes an amplifier 88, a sample and hold switch 89 in the form of a MOSFET transistor, and a sample and hold capacitor 90. The multiplex stage includes buffer amplifier 91 and a multiplex switch 92 in the form of a MOSFET transistor. Each row lines $X_1$-$X_4$ are connected to the input of the pre-amplifier 85 of a respective one of the channels 81 through 84. The restore capacitor 86 and the source to drain conduction path of the transistor 87 are connected in series in the order named between the output of the pre-amplifier 85 and ground. The gate of the transistor 87 is connected to the output of the inverting driver 59 which provides restore pulses thereto. The input of amplifier 88 is connected to the junction point between capacitor 86 and the source to drain conduction path of transistor 87. The output of amplifier 88 is connected through the source to drain conduction path of transistor 89 and the sample and hold capacitor 90 to ground. The gate of transistor switch 89 is connected to the output of the inverting driver 69 which provides sampling pulses thereto. The sample and hold capacitor 90 is connected to the input of buffer amplifier 91. The output of the amplifier 91 is connected through the source to drain conduction path of transistors 92 to an output line 93. The gates of transistors 92 of each of channels 81 through 84 is connected respectively to terminals 1 through 4 of row shift register 94.

The operation of the row readout circuit will now be explained. Prior to sensing a signal on the row lines $X_1$-$X_4$, restore switches 87 are actuated to set the voltage at the input of amplifiers 89. Thereafter, signals appear on the row lines causing changes in voltage levels at the output of amplifiers 88. The change in levels is sampled during the sampling interval by actuation of the sample switches 89 providing samples of the voltage levels on capacitors 90. The output levels appearing on sample and hold capacitors 90 of each of the readout channels 81 through 84 are then read out in sequence onto the output line 93 by successively actuating the switches 92 of the channels in succession by row shift register 94.

The row shift register 94, to which input pulses of the form shown in FIG. 10H are applied from the output of the driver 64 and which is clocked by the output of the clock pulse generator 15 provides at its output terminals 1 through 4 the voltage waveforms shown in FIGS. 10P through 10S, respectively. The latter outputs are utilized to sequentially connect or multiplex the sample signals appearing on sampling capacitors 90 of channels 81 through 84 to the output line 93.

To enable injection of charge stored in the devices of the array and also to re-establish storage voltages on all of the row lines thereof, row reset switches 101–104 are provided. The reset switches 101–104 are in the form of MOSFET transistors, each having a drain electrode connected to a respective one of the row conductor lines $X_1$-$X_4$ and each having a source electrode connected to the output of driver 77 which supplies the injection pulses of FIG. 10K. Each of the gate electrodes of the transistor switches 101–104 is driven by the injection gating pulses 71 of FIG. 10J.

To enable injection of charges from a row of devices it is essential not only to drop the voltages on row lines $X_1$-$X_4$ to zero but also to set the voltages on the column lines $Y_1$-$Y_4$ to zero for a short interval of time. This latter function is performed by the column line switches 106–109 in the form of MOSFET transistors each having a source electrode, a drain electrode and a gate electrode. Each of the drain electrodes of devices 106 through 109 is connected to a respective one of the column lines $Y_1$-$Y_4$ and each of the source electrodes of the devices 106–109 is connected to ground. Each of the gates of devices 106–109 is connected to the output of driver 73 which provides pulses 71 of the form shown in FIG. 10J.

To obtain on a row line a signal which is proportional to the sum of the charges stored in the devices of a row in accordance with a particular summation code, charges to be summed with one sign are stored in the column line coupled sites and charges to be summed with the opposite sign are stored in the row line coupled sites of the row. At the time for obtaining the summation, the charges of each of the devices are transferred, that is, the charges stored in the column sites of the row are transferred to the row sites thereof and the charges stored in the row sites of the row are transferred to the column sites. The net induced voltage on the row line thus represents a signal proportional to the algebraic sum of the stored charges. The code generator 110 provides the voltage waveforms to the the column lines $Y_1$-$Y_4$ to effect such summation operations. The code generator 110 has an input terminal connected to the output of the clock pulse generator 15 and has output terminals 1, 2, 3, and 4 connected to lines $Y_1$-$Y_4$, respectively. The outputs appearing on terminals 1-4 of code generator 110 are shown in FIGS. 10L through 10O, respectively.

In the operation of the apparatus, the base voltage of $-10$ volts of the injection pulse waveform of FIG. 10K establishes the charge storage capability of the row connected cells of each of the devices of the array. The base voltage of $-20$ volts of the outputs of the code generator 110 as shown in FIGS. 10L through 10O establishes the charge storage capability of the column connected cells of each of the devices of the array. Thus, at a particular time, if the voltage on a row connected cell of a device is $-10$ volts and the voltage on a column connected cell of the device is $-20$ volts, the charge would be stored in the column connected cell and, of course, if the column connected cell has a voltage of zero on it, the charge in the device would be stored in the row connected cell. During an interval of scan of a pattern of radiation across an array of devices in the column direction of the array, as described in connection with FIG. 3A, a row of elements of the radiation pattern moves from a predetermined position in relation to a row of devices of the array to the same position in relation to an adjacent row of devices of the array. During this interval scan charge is being generated in each of the devices and stored therein. An interval of scan may be considered to begin upon termination of the restoration pulse of FIG. 10F and continue to the termination of the next succeeding restoration pulse. Prior to the occurrence of the first restoration pulse of FIG. 10F an injection pulse 75 of FIG. 10K is applied to the transistor switches 101 through 104 and an injection gating pulse 71 of FIG. 10J is applied to the gates of transistors 101 through 104, 106 through 109 to inject any charge stored in the devices. Upon the occurrence of the first restore pulse of FIG. 10F, a potential is established across the restore capacitor 86 corresponding to the reference level of the row lines $X_1$-$X_4$ at that time. Prior to the occurrence of the first restore pulse, the voltage on the column lines $Y_1$-$Y_4$ is preset by the waveforms of FIGS. 10L through 10O depending on the summation code to be applied for summation of the charges stored in the devices of each of the rows of devices. As during the first cycle of scan the charges generated and stored in each of the row of devices are to be summed with a positive sign, the column line voltages are set at −20 so that accumulated charge is stored in the column coupled cells. After injection and the termination of the restore pulse at time $t_a$, charge accumulates in the devices of the array in accordance with the radiation received from the elements of the radiation pattern. At a subsequent time $t_b$ at which it is desired to obtain the algebraic sum of the charges stored in each of the rows of devices the column lines $Y_1$-$Y_4$ are raised to zero volts thereby effecting the transfer of charge stored in the column cells of the devices of all of the rows into the row cells of the devices producing a change in voltage that is sampled by the first sampling pulse of the waveform of FIG. 10I. The change in voltage level of each of the column lines $X_1$-$X_4$ is sensed and stored on capacitor 90 of channels 81 through 84, respectively. The voltages appearing on capacitors 90 of channels 81 through 84 is multiplexed onto the output line 93 by sequentially appearing pulses of FIGS. 10P through 10S applied to the switches 92 of channels 81 through 84, respectively. The resultant transformed video is shown in FIG. 10T. The level $S_{1A}$ represents the sum of the charges in the first row accumulated during the first integration interval and summed in accordance with the summation code $T_A$ set forth in FIG. 2A. Similarly the level $S_{2A}$ represents the sum of the charges in the second row of devices summed with the summation code $T_A$. Similarly the levels $S_{3A}$ and $S_{4A}$ represent the sums of the charges in the third and fourth rows, respectively, summed in accordance with the summation code $T_A$. After readout of the charges stored in the devices of the array, the row and column lines are raised to zero by the occurrence of the injection gating pulse 71 and injection pulse 75 to inject the stored charges into the substrate and enable a second cycle of scan to occur. After injection of the charges the voltages on the column lines $Y_1$-$Y_4$ are preset in accordance with the summation to be applied to the next accumulation of charge in the storage devices.

As shown in the waveform diagrams of FIGS. 10L through 10O, at time $t_c$ the voltages on column lines $Y_1$ and $Y_2$ are dropped to −20 volts and the voltage on column lines $Y_3$ and $Y_4$ continue at zero volts. This is done in accordance with the summation code $T_B$ which specifies that the charges in the first and second devices of the rows are to be summed with a positive sign and the charges in the third and fourth devices on a row are to be summed with a negative sign. Once these voltages are established the second restoration pulse of FIG. 10F occurs and the second integration cycle begins at time $t_d$ coincident with termination of the restore pulse 55. Charge is transferred between cells in the devices, as explained above, and sampling and readout occurs, also as explained above, to provide a second set of summation signals in accordance with the summation code $T_B$ as shown in FIG. 10T. During the third, fourth, and fifth intervals of scan the summation signals in the third, fourth, and fifth columns of FIG. 3B are obtained by application of the summation codes $T_C$, $T_D$, and $T_A$, respectively.

The transformed video output of FIG. 10T appearing on line 93 is amplified by amplifier 114 and applied to the signal reconstruction circuit 16 which converts the transformed video output into a video signal corresponding to the values of intensity of each of the elements of the pattern of radiation. The pattern of radiation may be displayed on a suitable display device, such as an oscilloscope. The signal reconstruction circuit 16 may comprise a microprocessor with memory in which the transformed video output is stored and from which selected sums such as the sums $S_{4A}$, $S_{4B}$, $S_{4C}$, and $S_{4D}$, as described in connection with FIG. 3B, are selected and processed according to the equations displayed in FIG. 2C to arrive at the values of the intensities of each of the elements of the fourth row of the pattern of radiation. The fifth, sixth, seventh, and eighth and other rows of the radiation pattern are processed in sequence to provide thereby at the output of the signal reconstruction circuit a sequence of integrated values of radiation received from the successive elements of a row and from successive rows.

While in the apparatus of FIG. 9 the summations were in accordance with a Hadamard matrix to provide a Hadamard transform of the charges stored in the devices of the array with each summation signal corresponding to a transform point, it will be understood that other transforms may be utilized in accordance with the present invention. While the apparatus described in connection with FIG. 9 included the array of FIG. 4, it will be apparent that other arrays may be used for infrared applications. Where it is desired to provide sensitivity to selected bands of infrared radiation, arrays constituted of compound semi-conductor materials would be used, for example, arrays constituted of indium antimonide semi-conductor material.

While the invention has been described in connection with an array of 16 devices, it is apparent that the invention is applicable to arrays including devices many times greater in number than 16. Of course, when a larger number of devices and larger arrays are utilized, the appropriate order of transform would be utilized in connection therewith.

While the invention has been described in connection with an array constituted of an N-type conductivity substrate, the P-type conductivity substrate could as well have been used. Of course, in such a case the applied potentials would be reversed in polarity.

When the apparatus is used for the detection of patterns of infrared radiation, it is desirable to incorporate the detector, and the other portions of the apparatus as well, in a low-temperature environment, that is, included the apparatus in a Dewar to reduce the noise generated by the detectors. The entire apparatus would be included in the Dewar except for the lead-in lines from the clock pulse generator and the output line from the output amplifier 114.

While the invention has been described in specific embodiments, it will be understood that modifications, such as those described above, may be made by those skilled in the art, and it is intended by the appended claims to cover all such modifications and changes as fall within the true spirit and scope of the invention.

What I claim as new and desire to secure by Letters Patent of the United States is:

1. In combination,
    a substrate of semiconductor material of one type conductivity having a major surface,
    first means forming a first plurality of charge storage sites for opposite type carriers adjacent said major surface of said substrate,
    second means forming a second plurality of charge storage sites for opposite type carriers adjacent said major surface of said substrate, each coupled to a respective charge storage site of said first plurality to form a plurality of coupled pairs of charge storage sites,
    said couple pairs of charge storage sites being arranged in an array of rows and columns,
    a plurality of row conductor lines and a plurality of column conductor lines,
    said first means including a first plurality of electrodes each insulatingly overlying a respective one of said storage sites of said first plurality, each of the electrodes of said first plurality in a respective row of sites being connected to a respective row line,
    said second means including a second plurality of electrodes, each insulatingly overlying a respective one said storage sites of said second plurality, each of the electrodes of said second plurality in a respective column of sites being connected to a respective column line,
    means for scanning a two-dimensional pattern of radiation having elements located in a matrix of columns and rows across said substrate in the column direction thereof at a substantially constant rate to produce a pattern of opposite type carriers of variable quantity in said plurality of storage sites,
    said pattern of radiation having the same number of elements in a row as the number of storage sites in a row of storage sites, said pattern having a number of elements in a column exceeding the number of storage sites in a column of storage sites, the column to column spacing of said elements being equal to the column to column spacing of said storage sites, the row to row spacing of said elements being equal to the row to row spacing of said storage sites, a row of elements of said pattern of radiation scanning from a row of storage sites to an adjacent row of storage sites in a predetermined interval of time,
    means for algebraically summing at the end of a predetermined interval of scan the quantities of opposite type carriers stored in each of said rows of storage sites with an agebraic summation code to derive a respective summation signal and thereafter injecting said quantities of opposite type carriers into said substrate, the quantity of opposite type carriers in each storage site being proportional to a respective element of said pattern of radiation,
    the algebraic summation at the end of each successive interval of scan being in accordance with a respective successive algebraic summation code, said successive algebraic summation codes constituting a repeating one-dimensional transform.

2. The combination of claim 1 in which said one-dimensional transform is a complete one-dimensional Hadamard transform.

3. The combination of claim 1 in which multiplexing means are provided for reading out each of said summation signals in sequence.

4. The combination of claim 1 including means for selecting from said summation signals a set of summation signals corresponding to a one-dimensional transform of a row of elements of said two-dimensional pattern of radiation and obtaining the inverse transform thereof to derive a plurality of signals, each proportional to a respective element of said row of elements of said pattern of radiation.

* * * * *